(12) United States Patent
Tha

(10) Patent No.: US 11,458,941 B2
(45) Date of Patent: Oct. 4, 2022

(54) METHOD FOR DECELERATING A TRAILER VEHICLE, WHEEL MODULE FOR PERFORMING THE METHOD AND VEHICLE COMBINATION HAVING A WHEEL MODULE OF THIS TYPE

(71) Applicant: WABCO Europe BVBA, Brussels (BE)

(72) Inventor: Ingo Tha, Lehrte (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 624 days.

(21) Appl. No.: 16/466,659

(22) PCT Filed: Jan. 11, 2018

(86) PCT No.: PCT/EP2018/050687
§ 371 (c)(1),
(2) Date: Jun. 5, 2019

(87) PCT Pub. No.: WO2018/134117
PCT Pub. Date: Jul. 26, 2018

(65) Prior Publication Data
US 2019/0322256 A1 Oct. 24, 2019

(30) Foreign Application Priority Data
Jan. 21, 2017 (DE) .......................... 102017000547

(51) Int. Cl.
*B60T 8/32* (2006.01)
*B60T 8/17* (2006.01)
(Continued)

(52) U.S. Cl.
CPC .............. *B60T 8/323* (2013.01); *B60T 8/172* (2013.01); *B60T 8/176* (2013.01); *B60T 8/1708* (2013.01);
(Continued)

(58) Field of Classification Search
CPC ........ B60T 8/323; B60T 8/1708; B60T 8/172; B60T 8/176; B60T 2230/06; B60T 2250/00; B60T 2270/10
See application file for complete search history.

(56) References Cited

U.S. PATENT DOCUMENTS

| 4,740,041 A | 4/1988 | Pannbacker |
| 2005/0001477 A1 | 1/2005 | Mederer et al. |

(Continued)

FOREIGN PATENT DOCUMENTS

| CN | 1551845 A | 12/2004 |
| CN | 1553871 A | 12/2004 |

(Continued)

*Primary Examiner* — Russell Frejd
(74) *Attorney, Agent, or Firm* — Leydig, Voit & Mayer, Ltd.

(57) ABSTRACT

A method for decelerating a trailer vehicle in a vehicle combination having a tractor vehicle and at least one trailer vehicle includes determining, by a wheel module at a respective wheel of the trailer vehicle, acceleration measurement values of the respective wheel, generating, by the wheel module, an information signal taking into account the acceleration measurement values of the respective wheel, and transmitting the information signal in a wireless fashion. The method further includes evaluating the acceleration measurement values and monitoring the acceleration measurement values with respect to a locking tendency of the respective wheel, and when an information signal of the wheel module is received, adjusting, by an electronic brake control unit, the trailer brake pressure taking into account the information signal.

12 Claims, 2 Drawing Sheets

(51) Int. Cl.
*B60T 8/172* (2006.01)
*B60T 8/176* (2006.01)

(52) U.S. Cl.
CPC ....... *B60T 2230/06* (2013.01); *B60T 2250/00* (2013.01); *B60T 2270/10* (2013.01)

(56) References Cited

U.S. PATENT DOCUMENTS

| | | | |
|---|---|---|---|
| 2005/0011693 | A1 | 1/2005 | Horn et al. |
| 2006/0033308 | A1* | 2/2006 | Waldbauer ............. B60T 8/241 |
| | | | 280/455.1 |
| 2009/0273232 | A1 | 11/2009 | Barlsen et al. |
| 2010/0152920 | A1* | 6/2010 | McCann ................... B60T 7/20 |
| | | | 701/2 |
| 2010/0292898 | A1 | 11/2010 | Stoehr |
| 2017/0225667 | A1 | 8/2017 | Risse et al. |
| 2018/0126968 | A1* | 5/2018 | Eckert .................... B60T 8/323 |

FOREIGN PATENT DOCUMENTS

| | | | |
|---|---|---|---|
| CN | 203623651 U | 6/2014 | |
| DE | 102005025622 A1 | 10/2006 | |
| DE | 102008022026 A1 | 11/2009 | |
| DE | 102009008342 A1 | 9/2010 | |
| DE | 102011089534 A1 | 3/2013 | |
| DE | 102014015132 A1 | 4/2016 | |
| DE | 102015013761 | * 4/2017 | ........... B60T 8/1887 |
| EP | 0209664 A2 | 1/1987 | |
| GB | 1444940 | * 8/1976 | |
| GB | 2509791 A | 7/2014 | |
| WO | WO 2004000578 A2 | 12/2003 | |
| WO | WO 2008124073 A1 | 10/2008 | |
| WO | WO 2016010850 A1 | 1/2016 | |

\* cited by examiner

METHOD FOR DECELERATING A TRAILER VEHICLE, WHEEL MODULE FOR PERFORMING THE METHOD AND VEHICLE COMBINATION HAVING A WHEEL MODULE OF THIS TYPE

CROSS REFERENCE TO RELATED APPLICATIONS

This application is a U.S. National Stage Application under 35 U.S.C. § 371 of International Application No. PCT/EP2018/050687 filed on Jan. 11, 2018, and claims benefit to German Patent Application No. DE 10 2017 000 547 filed on Jan. 21, 2017. The International Application was published in German on Jul. 26, 2018 as WO 2018/134117 A1 under PCT Article 21(2).

FIELD

The invention relates to a method for decelerating a trailer vehicle in a vehicle combination having a tractor vehicle and at least one trailer vehicle, wherein wheel brakes of the trailer vehicle are activated pneumatically by means of trailer brake pressure, to a wheel module for performing such a method, and to a vehicle combination having a motor vehicle and at least one trailer vehicle with such a wheel module arranged on at least one wheel.

BACKGROUND

Modern utility vehicles with pneumatically activated wheel brakes generally have an electronic brake control unit which can act on the individual adjustment of the brake pressure in order to, inter alia, implement driving stability functions. In electronic brake systems (EBS), the control is generated and processed as an electrical signal in the control transmission. In this context, preferably electronic brake systems, having three-channel or four-channel systems in which the brake pressure of the individual wheels or axles can be regulated independently of one another, are used. Independently of electronic brake systems (EBS), anti-lock systems (ABS) can be added to brake systems, which anti-lock systems (ABS) prevent, when a locking tendency is detected, the locking of the wheels during braking and at the same time preserve the steerability and the driving stability. This is because, in every braking operation, just a braking force which corresponds to the coefficient of friction of the underlying surface can be used. If the applied braking force exceeds the maximum transmissible braking force at one or more wheels, they begin to lock, as a result of which the motor vehicle can become unstable. An anti-lock system usually monitors the rotational speed of each wheel by means of measurement signals from rotational speed sensors, and determines the respective wheel slip from said rotational speeds. This can be done, for example, by comparing the wheel speed determined from the wheel rotational speed with a generated vehicle reference speed. If a locking tendency of a wheel is detected from the evaluation of the measurement signal of the rotational sensors, that is to say a slip limit is reached or exceeded, the brake control unit assumes control over the adjustment of the brake pressure.

In vehicle combinations, that is to say a combination of a motorized tractor vehicle and at least one trailer vehicle, the tractor vehicle makes available, via a pneumatic coupling head, a trailer brake pressure which acts on the wheel brakes of the trailer vehicle in the brake system of the trailer vehicle. In the case of deceleration, that is to say braking of a vehicle combination, in particular with control interventions of a brake control unit, the trailer vehicle should always be braked as well, in order to stretch the vehicle combination or avoid sliding forward of the trailer vehicle forward onto the tractor vehicle. If the trailer vehicle is equipped with an anti-lock system, this prevents locking of the wheels of the trailer vehicle even if the trailer brake pressure is higher than the wheels and the tires fitted thereon can transmit given the corresponding coefficient of friction of the underlying surface. The locking of one or more wheels could lead to skidding or swinging out of the trailer vehicle ("trailer swing").

SUMMARY

In an embodiment, the present invention provides a method for decelerating a trailer vehicle in a vehicle combination having a tractor vehicle and at least one trailer vehicle. Wheel brakes of the trailer vehicle are activated pneumatically by a trailer brake pressure. The method includes determining, by a wheel module at a respective wheel of the trailer vehicle, acceleration measurement values of the respective wheel, generating, by the wheel module, an information signal taking into account the acceleration measurement values of the respective wheel, and transmitting the information signal in a wireless fashion. The method further includes evaluating the acceleration measurement values and monitoring the acceleration measurement values with respect to a locking tendency of the respective wheel, and when an information signal of the wheel module is received, adjusting, by an electronic brake control unit, the trailer brake pressure taking into account the information signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
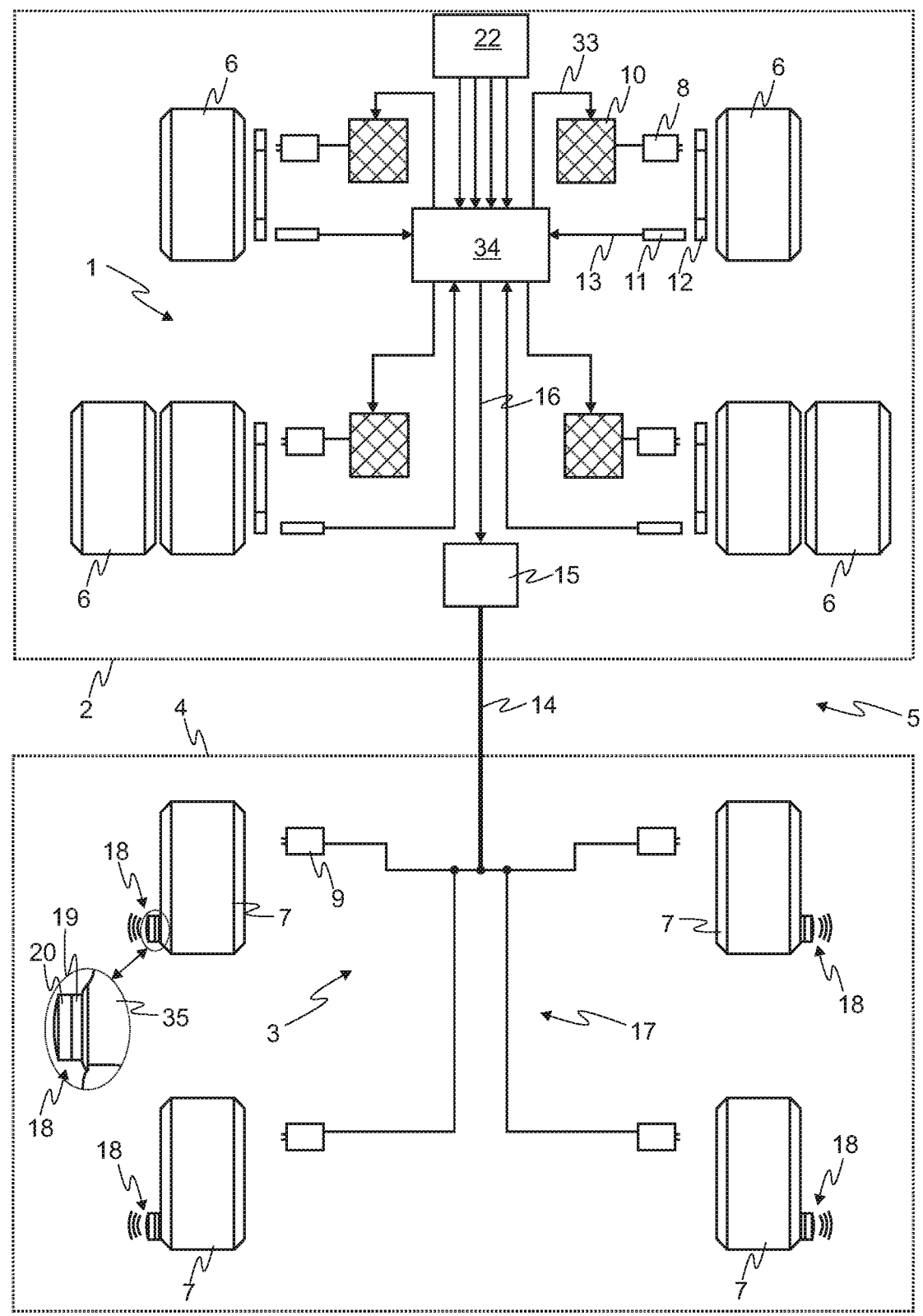
FIG. 1 shows a schematically illustrated brake system of a vehicle combination having a tractor vehicle and a trailer vehicle according to an embodiment of the invention.

Although modern trailer vehicles are usually equipped with anti-lock systems, many trailer vehicles continue to be used without an anti-lock system. Trailer vehicles without anti-lock systems are particularly widespread in non-European countries.

If the trailer vehicle is not equipped with an anti-lock system or an anti-lock system which is possibly present has failed during operation, the trailer brake pressure which is to be set has to be estimated. Information is not available from any of the wheels of the trailer vehicle and it must be attempted to select the trailer brake pressure applied to the pneumatic coupling head in such a way that, on the one hand, as far as possible no wheels lock but, on the other hand, sufficient trailer brake pressure is applied in order to avoid the trailer vehicle sliding forward and the vehicle combination experiencing so-called jack-knifing. Information about the loading and coefficient of friction of the underlying surface are not always present, or are only present with limited accuracy. In particular in the case of a vehicle combination with drawbar or central axle trailers, in the case of partial loading the distribution of the loading between the tractor vehicle and the trailer is often unclear, which also makes it difficult or impossible to set a suitable trailer brake pressure. Against this background it is generally very difficult to estimate a suitable trailer brake pressure.

Embodiments of the invention provide for counteracting skidding or sliding forward of a trailer vehicle without an anti-lock system onto the vehicle travelling ahead during a deceleration process with low expenditure for the equipment of the vehicles.

Embodiments of the invention provide methods for decelerating a trailer vehicle, wheel modules for performing such methods, and vehicle combinations having a motor vehicle and at least one trailer vehicle having such a wheel module.

According to embodiments of the invention, at one or more wheels of the trailer vehicle acceleration measurement values of the respective wheel are determined by a wheel module, and an information signal is generated taking into account the acceleration measurement values. The information signals are transmitted in a wireless fashion and fed in this way to an electronic brake control unit. For this purpose, the brake control unit is assigned a receiver for receiving information signals of the wheel modules, wherein the brake control unit is designed to set the trailer brake pressure, which acts at least on the wheel brake of the same wheel as the transmitting wheel module, as a function of the received information signals. In this context, the acceleration measurement values are evaluated and monitored with respect to a locking tendency, wherein the brake control unit counteracts, through corresponding adaptation of the trailer brake pressure, a locking tendency of a wheel in terms of performing open-loop or closed-loop control of the trailer brake pressure.

The wheel module according to the invention is an assembly of a modular brake system, which assembly can be mounted with simple means on a wheel of a trailer vehicle, for example can be attached to the rim. The wheel module comprises here an acceleration sensor coupled to the radial and/or to the tangential acceleration of the wheel, and module electronics which are designed to generate the information signal taking into account the acceleration measurement values determined by the acceleration sensor. The acquired acceleration measurement values comprise here information on the acceleration of the respective wheel of the trailer vehicle in the radial direction and/or tangential direction. Finally, the wheel module according to the invention has a transmitter device for the wireless transmission of the information signal. Such a wheel module can easily be retrofitted as a compact assembly to existing trailer vehicles, with the result that even in the case of trailer vehicles without anti-lock systems or in the event of a failure of a possible present anti-lock system it is possible to monitor the tendency to lock of individual wheels.

The evaluation and monitoring with respect to a locking tendency of the respective wheel is realized by means of an algorithm which is implemented in an evaluation electronics. In order to evaluate the acceleration measurement values it is possible to use algorithms such as are applied, for example, in already known anti-lock systems for similar evaluation purposes. By taking into account the locking tendencies of the wheels which are determined by means of wheel modules, open-loop or closed-loop control of the trailer brake pressure is provided depending on the embodiment. The quality of the brake pressure closed-loop control for the trailer vehicle which is carried out by the brake control unit of the tractor vehicle will probably not reach the quality level of anti-lock systems, owing to the principle involved. Nevertheless, with simple means it is possible to provide a significant improvement in the braking situation for trailer vehicles without anti-lock systems and corresponding equipment, and skidding or swinging out and sliding forward of such trailer vehicles onto the vehicle travelling in front are counteracted.

In one advantageous embodiment of the invention, each wheel of the trailer vehicle of the vehicle combination has a wheel module, with the result that the locking tendency of each wheel can be monitored. If a common trailer brake pressure is applied to the wheel brakes of the trailer vehicle from a common brake circuit, a single-channel anti-lock system is provided by means of the setting of the trailer brake pressure.

In one embodiment of the invention, the acceleration measurement values are transmitted in a wireless fashion by means of the information signal, wherein the evaluation and monitoring of the locking tendency of the respective wheels are carried out centrally in the periphery of the brake control unit. In one particularly preferred embodiment of the invention, the evaluation electronics for monitoring the acceleration measurement values are, however, part of the module electronics and are connected to the transmitter device of the wheel module. The acceleration measurement values are therefore evaluated directly in the wheel module and in the process a locking tendency of the respective wheel is qualitatively determined. Corresponding to the evaluation of the acceleration measurement values and the locking tendency determined in the process, corresponding information signals are generated and transmitted in a wireless fashion. The wheel module is therefore an active assembly which can be mounted on a wheel using simple means. The module's own electronics determine information about the locking tendency of the respectively monitored wheel and ultimately transmit them in a wireless fashion, with the result that the information can be taken into account by a brake control unit in the tractor vehicle. In a tractor vehicle, a receiver for the wireless reception of the information signals is assigned to the brake control unit. The receiver is adapted here to the wireless communication technology of the wheel modules.

In one further advantageous embodiment, the wheel module determines as a function of the evaluation of the acceleration measurement values a pressure change of the trailer brake pressure in accordance with the detected locking tendency. The pressure change which is necessary to avoid locking of the wheel of the trailer vehicle is requested by the wheel module from the brake control unit by means of the information signal. In other words, the wheel module generates an information signal whose information is a desired change in the trailer brake pressure which is to be made available by the brake control unit at the pneumatic coupling head of the tractor vehicle. The brake control unit sets the trailer brake pressure at the coupling head in accordance with the requested pressure change.

In one advantageous embodiment, the determined pressure change which is also requested by the brake control unit is a qualitatively determined tendency to change the brake pressure similarly to the actuation of ABS valves, that is to say for example a request to increase the pressure or to aerate, that is to say to lower the brake pressure. In a further advantageous embodiment, the wheel module directly determines a desired setpoint brake pressure which is requested by means of the information signal and is to be set by the brake control unit when the information signal is received. If the brake control unit receives the information signals from a plurality of wheel modules, according to a predefined evaluation instruction one of the requested pressure changes is implemented or one of the requested setpoint brake pressures is set.

In the particularly preferred embodiment of the invention, the wheel modules transmit information signals only if a qualitatively predefined locking tendency is determined. In this context, the result of the evaluation of the acceleration measurement values and of the locking tendency calculated there is compared with a predefinition, and only when the threshold values which are predefined in this way are undershot or exceeded is an information signal generated for the brake control unit so that the trailer brake pressure is adapted. In this way, the energy requirement of the active wheel module is reduced and as a result the energy supply by means of a battery is preserved. As soon as a qualitative locking tendency is determined, that is to say a predefined threshold is reached or exceeded, a corresponding information signal is transmitted. In one embodiment of the invention, the exceeding of a threshold for a negative wheel acceleration is provided. Alternatively or additionally it is monitored whether a wheel slip threshold is exceeded, that is to say whether the wheel is close to locking or is already locking. Additionally or alternatively, the predefinition of a threshold for the positive wheel acceleration is provided, which threshold is active in particular when a wheel is running up.

Depending on the embodiment of the brake system, the brake pressures at the wheel brakes of the trailer vehicle are determined individually, on an axle basis or a trailer brake pressure which is common to all the wheels is set taking into account the information signals of the wheel modules.

In the preferred embodiment of the invention, in a vehicle combination, the electronic brake control unit of the tractor vehicle is assigned a receiver for receiving information signals of the at least one wheel module, wherein the electronic brake control unit (34) is designed to set the trailer brake pressure (14) as a function of the received information signals (21).

FIG. 1 shows an electric-pneumatic diagram of the brake system 1 of a tractor vehicle 2, specifically of a utility vehicle, and of a brake system 3 of a trailer vehicle 4. The tractor vehicle 2 and the trailer vehicle 4 form a vehicle combination 5 in which the tractor vehicle 2 is motorized and pulls the trailer vehicle 4. The brake system 3 of the trailer vehicle 4 is activated to perform a braking operation by the brake system 1 of the tractor vehicle 2 in the way described hereafter.

Both the wheels 6 of the tractor vehicle 2 and the wheels 7 of the trailer vehicle 4 are respectively assigned pneumatically activated wheel brakes 8, 9. The wheel brakes 8, 9 decelerate the wheel 6, 7 which is respectively assigned to them, under the effect of a brake pressure. In the brake system 1 of the tractor vehicle 2, the setting of the brake pressure at the respective wheel brakes 8 is monitored by a brake control unit 34. Each wheel 6 of the tractor vehicle is assigned a pressure control valve 10 which can be individually actuated by the brake control unit 34. The brake control unit 34 can individually apply the brake pressure to each wheel 6 of the tractor vehicle 2 by means of corresponding actuation of the respective pressure control valve 10. In the exemplary embodiment shown, the brake control unit 34 and the brake pressure valves 10 are essential elements of an anti-lock system, which also includes rotational speed sensors 11 at the respective wheels 6. The rotational speed sensors 11 interact with a pole wheel 12 which is mounted on the respective wheel 6 of the tractor vehicle 2 and rotates therewith. The rotational speed sensor 11 is electrically connected to the brake control unit 34 and continuously communicates the rotational speed measurement values 13 acquired by it to the brake control unit 34.

The brake control unit 34 determines the wheel slip at the respective wheel 6 by means of the rotational speed measurement values 13. This can be done, for example, by comparing the wheel speed derived from the rotational speed measurement values 13 with a (calculated) vehicle reference speed. If a locking tendency of the wheel is detected by means of the wheel slip which is determined in this way, that is to say a slip limit is reached or exceeded, the brake control unit takes over the control of the setting of the brake pressure. For this purpose, the brake unit 34 generates electrical actuation signals 33 for the respective pressure control valves 10.

Furthermore, the brake control unit 34 determines a trailer brake pressure 14 which is made available at a pneumatic coupling head 15 of the tractor vehicle 2. For this purpose, the brake control unit 34 generates an electrical actuation signal 16 with which the coupling head 15 or a pressure control valve acting on the coupling head 15 is actuated. The actuation signal 16 here causes the provided trailer brake pressure 14 to be made available in the brake system 3, connected to the coupling head 15, of the trailer vehicle.

The wheel brakes 8 of each wheel 7 of the trailer vehicle 4 are connected to a common trailer brake circuit 17, and the trailer brake pressure 14, which can be set by the brake control unit 34 of the tractor vehicle 2, can therefore be applied to said wheel brakes 8.

Each wheel 7 of the trailer vehicle 4 is assigned a wheel module 18. Each wheel module 18 comprises an acceleration sensor 19 which is coupled to the rotational movement of the respective wheel 7. Such acceleration sensors are basically known per se. In order to couple the acceleration sensor 19 to the radial acceleration and/or tangential acceleration of the wheel 7 the wheel module 18 is arranged eccentrically. For this purpose, the wheel module 18 in the exemplary embodiment is mounted on the outer ring of a rim 35 of the wheel 7. The illustration in FIG. 1 is not to be understood as being true to scale. The wheel module 18 is illustrated in an enlarged detail in order to improve comprehension of the mounting principle.

Each wheel module also has a transmitter device 20 for the wireless transmission of an information signal 21. The brake control unit 34 of the tractor vehicle 2 is assigned a receiver 22 which is designed to receive information signals 21 of the wheel modules 18. The received information signals 21 are input into the brake control unit 34 which is designed to set the trailer brake pressure 14 as a function of the received information signals 21.

The wheel modules 18 finally comprise module electronics (reference number 23 in FIG. 2) which are designed to generate an information signal 21.

In the exemplary embodiment shown, the receiver 22 is arranged in the tractor vehicle 2, with the result that the receiver 22 acquires in a wireless fashion the information signals 21 of all the wheel modules 18 of the entire vehicle combination 5, and predefines them to the brake control unit 34 of the tractor vehicle 2 in order to correspondingly set the trailer brake pressure 14. In further exemplary embodiments, a receiver for interacting with the wheel modules is arranged in each case in the respective trailer vehicle 4, wherein the receiver is coupled to a central module which, for its part, passes on the received information signals 21, or an information signal 21 selected therefrom, to the brake control unit 34 of the tractor vehicle 2, for example via a signal line such as CAN or also in a wireless fashion.

Figure 2:
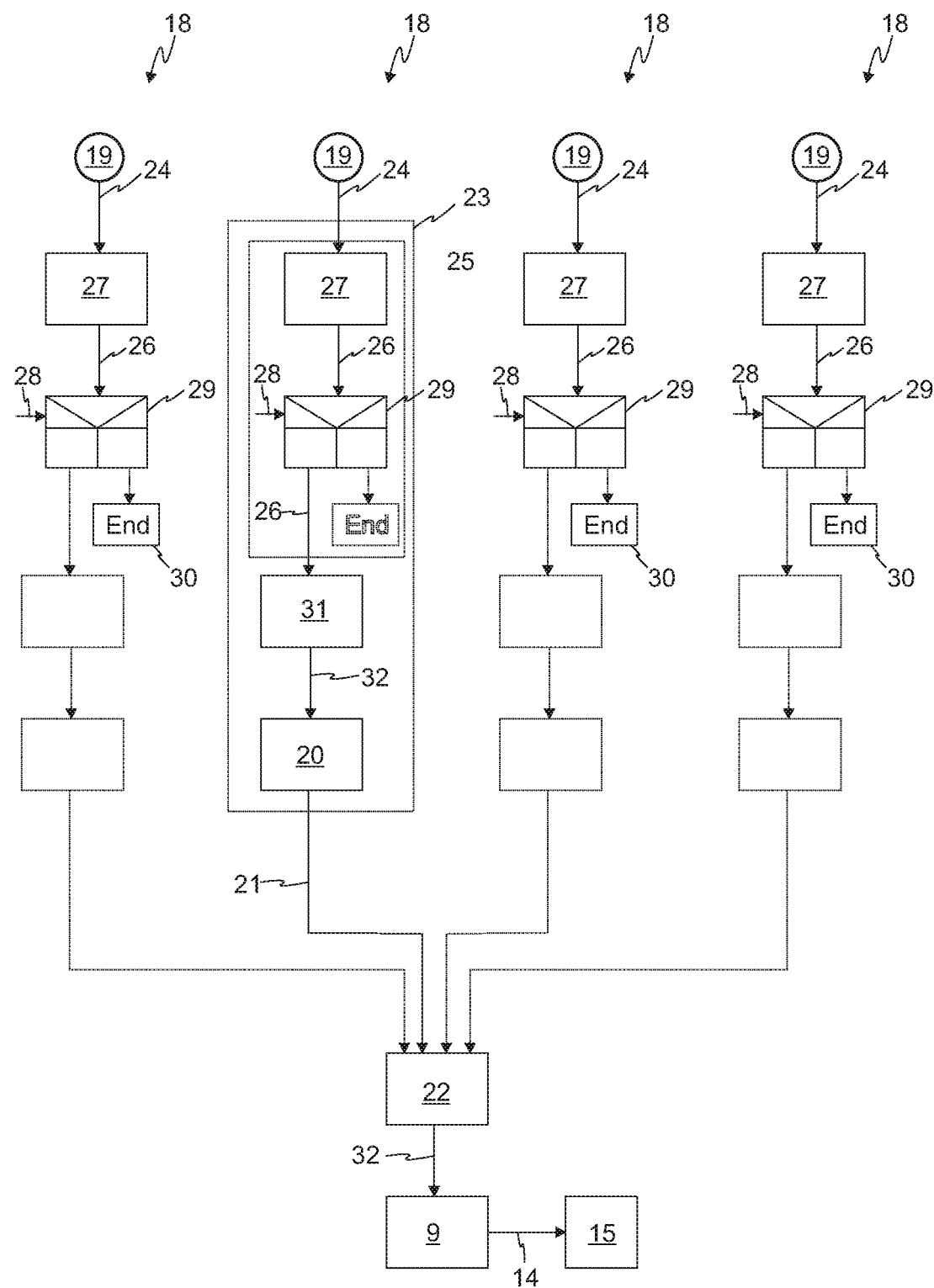
FIG. 2 shows a flow diagram of a method, according to an embodiment of the invention, for decelerating a vehicle combination having a tractor vehicle and the trailer vehicle according to FIG. 1.

FIG. 2 shows a flow diagram of a method for making available information signals 21 in each wheel module 18 and setting the trailer brake pressure 14 by means of the brake control unit 34 of the tractor vehicle. Each wheel module 18 comprises module electronics 23 which are designed to generate an information signal 21 taking into account the acceleration measurement values 24 determined by the respective acceleration sensor 19.

The acceleration measurement values 24 are evaluated here in an evaluation electronics 25, wherein a locking tendency 26 of the respective wheel is determined from the acceleration measurement values 24 using corresponding algorithms. In order to determine the locking tendency 26 from the acceleration measurement values, algorithms from the field of anti-lock systems are used. The evaluation electronics 25, which carry out evaluation 27 of the acceleration measurement values 24 in order to determine or estimate locking tendencies 26, are an integral component of the module electronics 23 in the exemplary embodiment shown. In further exemplary embodiments, the evaluation 27 is performed by external electronics modules, for example in the periphery or as part of the brake control unit 34.

The locking tendency 26, determined internally in the wheel module 18, of the respective wheel is compared (comparison 29) with a predefinition 28 which is, in particular, a threshold value, or a plurality of threshold values. In this context, a wheel slip threshold is predefined, at the exceeding of which the situation is induced that the respective wheel is deep in a slip process or is already locking, with the result that the tendency to lock should be counteracted. In a further exemplary embodiment, alternatively or additionally a negative wheel acceleration is provided as a threshold, which represents the situation that the respective wheel "drops out". In a further possibility, a positive wheel acceleration is predefined as a threshold, which defines a situation that the respective wheel is starting up again.

If during the comparison 29 of the determined value of a locking tendency 26 it becomes apparent that the predefinition 28, for example a wheel slip threshold, is reached or exceeded, the outputting of an information signal 21 by the transmitter device 20 is brought about. The wheel module 18 therefore transmits an information signal 21 solely if a need for action was detected within the scope of the comparison 29 of the determined locking tendency 26 with the predefinition 28. As long as the determined locking tendency 26 is below the predefinition 28, an information signal 21 is not generated or transmitted, which is represented by the state 30 in the diagram.

In the exemplary embodiment shown, determination 31 of a pressure change 32 of the currently set trailer brake pressure 14, which change is to be requested by the brake control unit 34 by means of the information signal 21, is carried out on the basis of the locking tendency 26. In other words, the wheel module 18 generates an information signal 21 with the quantitative information of a desired pressure change 32 of the trailer brake pressure. In terms of content, the request pressure change 32 is a qualitatively determined specification for changing the trailer brake pressure 14, that is to say an increase or reduction in the trailer brake pressure.

As an alternative, the wheel modules 18 determine a desired trailer setpoint brake pressure which is communicated as content of the information signal 21 to the brake control unit 34 of the tractor vehicle 2.

The information signal 21 is transmitted in a wireless fashion by the transmitter device 20, and after reception by the receiver 22 it is predefined to the brake control unit 34. The brake control unit 34 sets the trailer brake pressure 14 at the coupling head 15 in accordance with the requested pressure change 32 or the desired trailer setpoint brake pressure.

In a further exemplary embodiment (not shown), functions for checking the tire pressure and for measuring or monitoring the wheel speeds are integrated into the wheel module 18.

Each wheel module 18 of the trailer module 4 signals independently and actively the "desired" pressure change 32 of the trailer brake pressure, or a brake pressure for the respective wheel 7, on the basis of the respectively sensed behavior of the wheel 7 which is assigned to said wheel module 18. If a plurality of information signals are present at the brake control unit 34, that is to say a plurality of wheel modules 18 signal a locking tendency and request adaptation of the trailer brake pressure 14 in order to counteract the locking, the brake control unit decides which trailer brake pressure 14 the trailer vehicle is to be braked with, taking into account all the information signals 21, that is to say all the pressure changes 32 or trailer setpoint brake pressures which are present and requested.

The trailer brake pressure is preferably pulsed dynamically. In this context, a trailer brake pressure which has already been modulated is made available at the coupling head 15 of the tractor vehicle 2, with the result that an additional pressure control valve in the trailer vehicle 4 can be dispensed with.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1. Brake system
2. Tractor vehicle

3. Brake system
4. Trailer vehicle
5. Vehicle combination
6. Wheel
7. Wheel
8. Wheel brake
9. Wheel brake
10. Pressure control valve
11. Wheel rotational sensor
12. Pole wheel
13. Rotational speed measurement value
14. Trailer brake pressure
15. Coupling head
16. Actuation signal
17. Trailer brake circuit
18. Wheel module
19. Acceleration sensor
20. Transmitter device
21. Information signal
22. Receiver
23. Module electronics
24. Acceleration measurement value
25. Evaluation electronics
26. Locking tendency
27. Evaluation
28. Predefinition
29. Comparison
30. State
31. Determination
32. Pressure change
33. Actuation signal
34. Electronic brake control unit
35. Rim

The invention claimed is:

1. A method for decelerating a trailer vehicle in a vehicle combination having a tractor vehicle and at least one trailer vehicle, wherein wheel brakes of the trailer vehicle are activated pneumatically by a trailer brake pressure, the method comprising:
determining, by a wheel module at a respective wheel of the trailer vehicle, acceleration measurement values of the respective wheel,
generating, by the wheel module, an information signal taking into account the acceleration measurement values of the respective wheel,
transmitting the information signal in a wireless fashion,
evaluating the acceleration measurement values and monitoring the acceleration measurement values with respect to a locking tendency of the respective wheel, and
when an information signal of the wheel module is received, adjusting, by an electronic brake control unit, the trailer brake pressure taking into account the information signal, wherein
the acceleration measurement values are evaluated by evaluation electronics of the wheel module, and the evaluation electronics determine a locking tendency of the respective wheel from the acceleration measurement values, wherein information signals corresponding to the evaluation of the acceleration measurement values and of the locking tendency determined in the process are generated and transmitted in a wireless fashion.

2. The method as claimed in claim 1, wherein the wheel module requests an information signal corresponding to a desired pressure change from the electronic brake control unit and determines, as a function of the evaluation of the acceleration measurement values, a pressure change of the trailer brake pressure necessary to avoid locking of the respective wheel in order to correspondingly adjust the trailer brake pressure.

3. The method as claimed in claim 1, wherein the respective wheel module transmits information signals only in the case of a locking tendency being determined.

4. The method as claimed in claim 1, wherein the acceleration measurement values comprise the acceleration of the respective wheel in radial direction and/or in tangential direction.

5. The method as claimed in claim 1, wherein when an information signal of a wheel module is received, an electronic brake control unit of a tractor vehicle adjusts the trailer brake pressure for the trailer vehicle.

6. The method as claimed in claim 1, wherein a trailer brake pressure for the trailer vehicle, which pressure acts on the wheel brakes of the trailer vehicle, is made available at a pneumatic coupling head of the tractor vehicle.

7. A wheel module, for arrangement on a wheel of a trailer vehicle, the wheel module comprising:
an acceleration sensor configured to measure a radial and/or tangential acceleration of the wheel so as to provide acceleration measurement values,
module electronics configured to make available an information signal taking into account the acceleration measurement values determined by the acceleration sensor, and
a transmitter device configured to wirelessly transmit the information signal, wherein
the wheel module is assigned evaluation electronics which are designed to evaluate the acceleration measurement values and to monitor them with respect to a locking tendency of the respective wheel.

8. The wheel module as claimed in claim 7, wherein the evaluation electronics are part of the module electronics and are connected to the transmitter device.

9. A vehicle combination, comprising:
a tractor vehicle; and
a trailer vehicle,
wherein each of the tractor vehicle and the trailer vehicle includes, for each wheel thereof, a pneumatically activated wheel brake,
wherein the tractor vehicle has an electronic brake control unit for monitoring the wheel brakes of the tractor vehicle and a pneumatic coupling head for making available a trailer brake pressure for the wheel brakes of the trailer vehicle,
wherein a wheel module as claimed in claim 8 is arranged on a wheel of the trailer vehicle,
wherein the electronic brake control unit of the tractor vehicle is assigned a receiver for receiving information signals of the at least one wheel module, and
wherein the electronic brake control unit is designed to adjust the trailer brake pressure as a function of the information signals.

10. The vehicle combination as claimed in claim 9, wherein each wheel of the trailer vehicle has a wheel module.

11. The vehicle combination as claimed in claim 9, wherein a trailer brake pressure can be applied to the wheel brakes of the trailer vehicle from a common trailer brake circuit.

12. The vehicle combination as claimed in claim 9, wherein the tractor vehicle has the receiver for receiving information signals of the at least one wheel module.

* * * * *